United States Patent
Hummel et al.

(10) Patent No.: US 10,623,543 B2
(45) Date of Patent: Apr. 14, 2020

(54) STAND FOR MOBILE DEVICE

(71) Applicant: Samsonite IP Holdings S.àr.l., Luxembourg (LU)

(72) Inventors: Mark Gregory Hummel, Poway, CA (US); Bryan Lee Hynecek, Redwood City, CA (US); Christopher William Ledesma, Arcadia, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 16/038,795

(22) Filed: Jul. 18, 2018

(65) Prior Publication Data
US 2020/0028951 A1   Jan. 23, 2020

(51) Int. Cl.
*H05K 5/02* (2006.01)
*H04M 1/04* (2006.01)
*F16M 13/00* (2006.01)

(52) U.S. Cl.
CPC ............ *H04M 1/04* (2013.01); *F16M 13/005* (2013.01); *H05K 5/02* (2013.01)

(58) Field of Classification Search
CPC ..... F16M 13/005; H04M 1/04; H05K 5/0234; H05K 5/0017; H05K 14/04; H05K 14/638; G06F 1/166; G06F 1/626
USPC ......... 248/688, 346.03, 346.06, 346.01, 460, 248/682, 683; 361/679.55
See application file for complete search history.

(56) References Cited

U.S. PATENT DOCUMENTS

| | | | | |
|---|---|---|---|---|
| 4,763,763 A | * | 8/1988 | Sadow | A45C 13/26 150/108 |
| 5,732,928 A | * | 3/1998 | Chang | G06F 3/0208 248/456 |
| D626,964 S | | 11/2010 | Richardson et al. | |
| D667,831 S | | 9/2012 | Stravitz | |
| D669,085 S | | 10/2012 | Coberly | |
| 8,297,440 B2 | * | 10/2012 | Schmidt | F16M 11/10 206/320 |
| D674,396 S | | 1/2013 | Yang et al. | |

(Continued)

OTHER PUBLICATIONS

ZVE Kickstand Case (Nov. 12, 2016), https://www.amazon.com/ZVE-Horizontal-Reinforced-Kickstand-Shockproof/dp/B01M7YNQFB/ref=cm_cr_arp_d_product_top.

(Continued)

*Primary Examiner* — Nkeisha Smith
(74) *Attorney, Agent, or Firm* — Lerner, David, Littenberg, Krumholz & Mentlik, LLP

(57) ABSTRACT

A stand for a mobile device, including a platform and a flexible stand portion. The platform has a front side facing toward the mobile device, and a rear side opposite to the front side and facing away from the mobile device. The flexible stand portion has a sliding end portion that slides back and forth in a sliding direction, and a non-sliding end portion that rotates around a hinge portion. The flexible stand portion switches between a flat state where the non-sliding end portion is arranged against the rear side of the platform and the sliding end portion is arranged at a first locking position, and an curved state where the non-sliding end portion is rotated away from the rear side of the platform and the sliding end portion is arranged at a second locking position so that the flexible stand portion bows outward to form a curve or arch.

24 Claims, 13 Drawing Sheets

(56) References Cited

U.S. PATENT DOCUMENTS

| | | | | |
|---|---|---|---|---|
| 8,374,657 | B2* | 2/2013 | Interdonato | H04B 1/385 379/433.07 |
| D689,870 | S | 9/2013 | Fong et al. | |
| 8,550,317 | B2* | 10/2013 | Hyseni | A45F 5/00 224/197 |
| D697,069 | S | 1/2014 | Tak et al. | |
| D716,817 | S | 11/2014 | Yang | |
| 8,950,638 | B2* | 2/2015 | Wangercyn, Jr. | H04B 1/385 224/217 |
| 8,978,883 | B2 | 3/2015 | Gandhi et al. | |
| 8,985,543 | B2 | 3/2015 | Chen et al. | |
| D755,796 | S | 5/2016 | Gibson | |
| 9,372,507 | B2* | 6/2016 | Dekock | G06F 1/166 |
| 9,535,453 | B2* | 1/2017 | Dong | G06F 1/1626 |
| 9,683,694 | B2* | 6/2017 | Shiba | F16M 13/005 |
| 9,699,283 | B2* | 7/2017 | Aldana | H04M 1/04 |
| 9,717,314 | B2 | 8/2017 | Idehara et al. | |
| 9,768,822 | B1 | 9/2017 | Loh et al. | |
| 9,874,260 | B2 | 1/2018 | Blochlinger et al. | |
| 10,063,272 | B1* | 8/2018 | Yeo | H04B 1/3888 |
| D833,446 | S | 11/2018 | Elder | |
| D843,378 | S | 3/2019 | Langhein | |
| 2003/0213886 | A1* | 11/2003 | Gilbert | A47B 23/044 248/454 |
| 2005/0205623 | A1* | 9/2005 | Buntain | A45F 5/00 224/217 |
| 2011/0309117 | A1* | 12/2011 | Roberts | A45F 5/00 224/217 |
| 2012/0181196 | A1* | 7/2012 | Mongan | H04B 1/3877 206/320 |
| 2014/0262853 | A1* | 9/2014 | DeChant | A45C 1/06 206/45.2 |
| 2014/0332418 | A1 | 11/2014 | Cheung et al. | |
| 2015/0011269 | A1* | 1/2015 | Liu | G06F 1/16 455/575.1 |
| 2015/0092346 | A1* | 4/2015 | Ben | G06F 1/166 361/679.55 |
| 2015/0375894 | A1 | 12/2015 | Idehara et al. | |
| 2016/0157368 | A1* | 6/2016 | Dong | G06F 1/1626 361/679.55 |
| 2016/0286016 | A1* | 9/2016 | Lee | H04M 1/04 |
| 2017/0328514 | A1* | 11/2017 | Cavalcante | H04B 1/385 |

OTHER PUBLICATIONS

Vena Wallet Case (Oct. 1, 2016), https://www.amazon.com/Vena-vCommute-Military-Protection-KickStand/dp/B01KUFTXUM/ref=cm_cr_arp_d_product_top.

WizGear Shell Holster Case (Nov. 17, 2016), https://www.amazon.com/dp/B01MA3N3OF/ref=sxbs_sxwds-stvpv2_1.

I-Blason Transformer Shell Holster Case (Apr. 10, 2015), https://www.amazon.com/i-Blason-Transformer-Holster-Kickstand-Locking/dp/B00TVEXWII/ref=sr_1_103.

Qeeplo Carbon Fiber Cases (Jul. 10, 2018), https://qeeplo.com/collections/frontpage.products/carbon-fiber-case.

Extended European Seach Report for Application No. 19185300.1 dated Oct. 10, 2019, 7 pages.

* cited by examiner

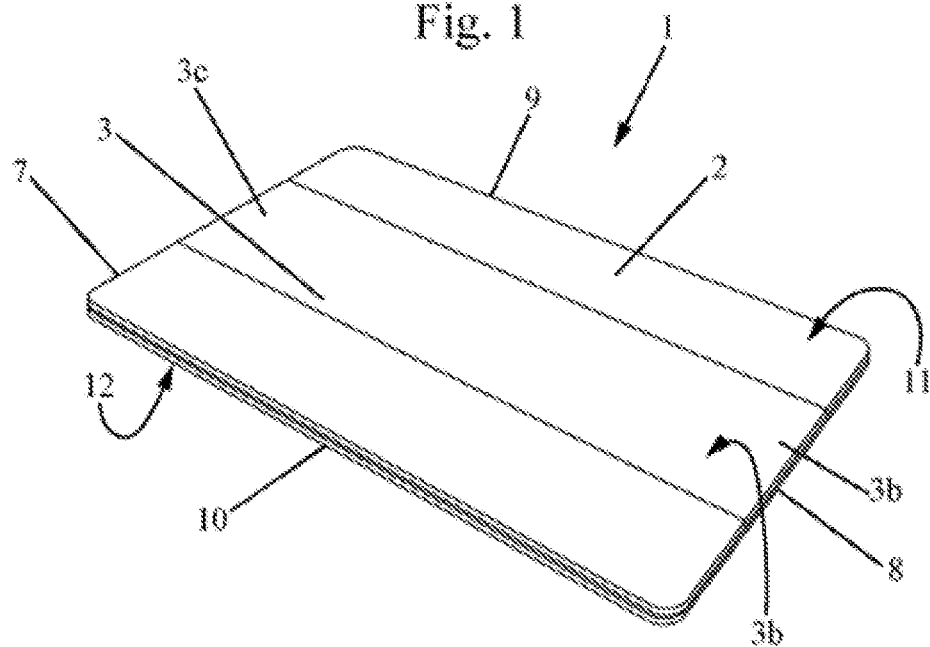
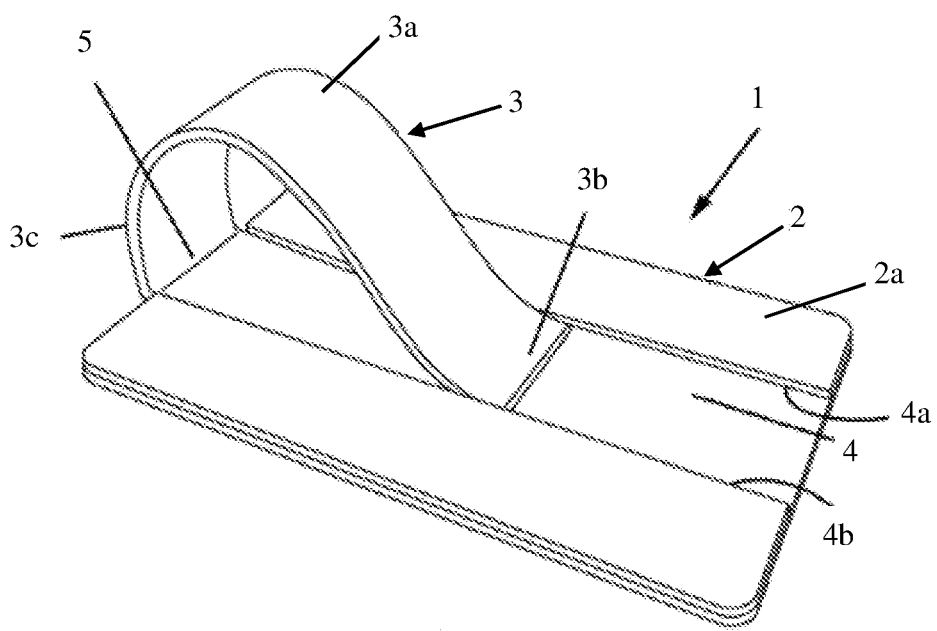

Fig. 3
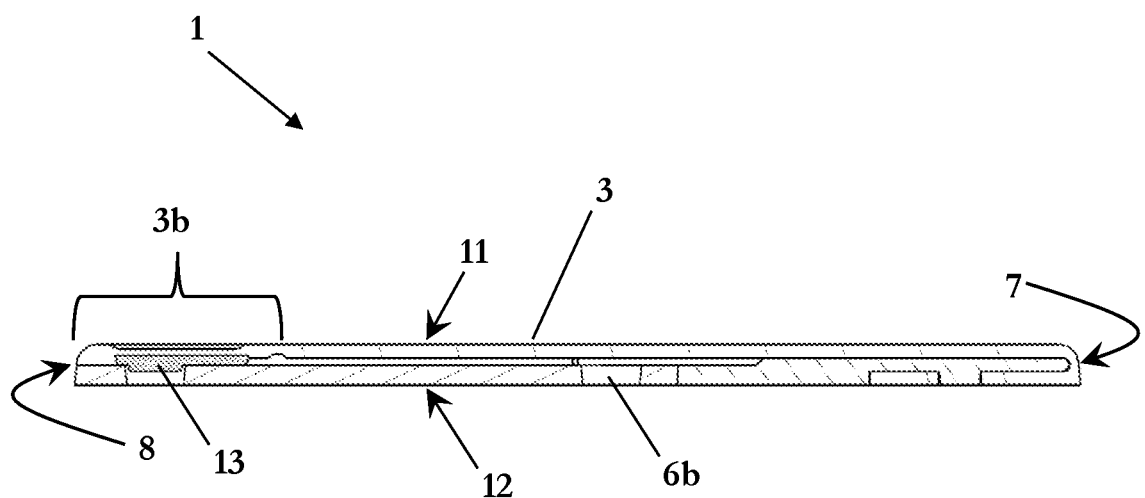
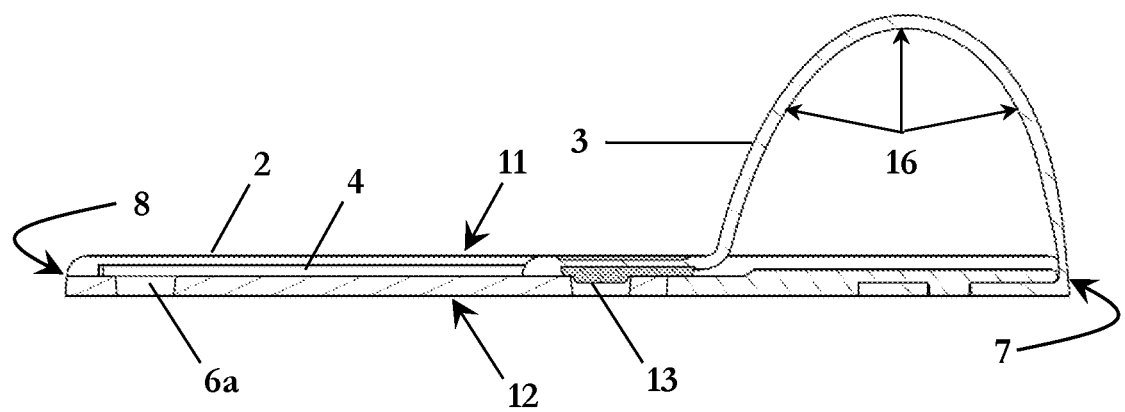
Fig. 4

Fig. 9
Fig. 10
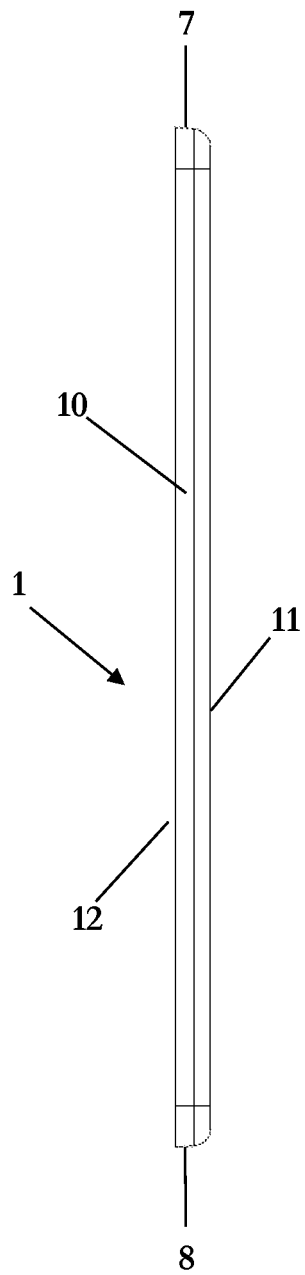
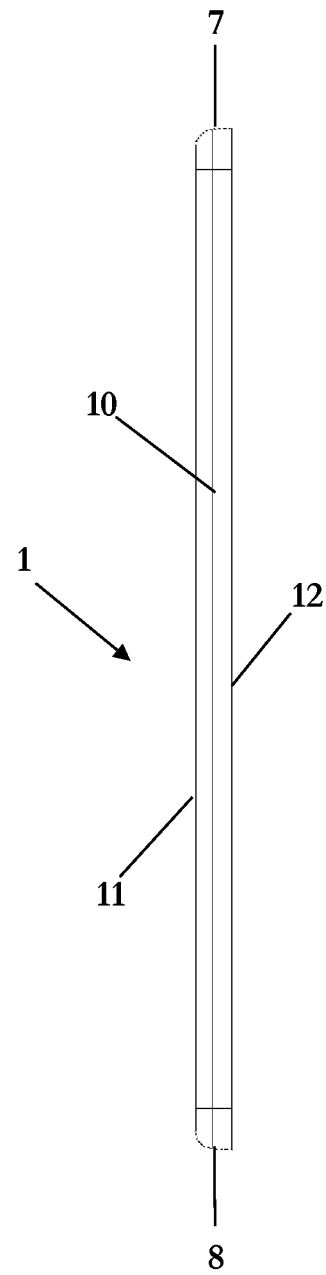

STAND FOR MOBILE DEVICE

FIELD OF THE INVENTION

The present invention relates to a stand for a mobile device. The stand is preferably transparent to radio frequencies ("RF") and other wireless transmissions so that so that wireless transmissions can be sent and received by the mobile device when attached to the stand. The stand also forms a finger loop so that a mobile device can be securely held by a user when attached to the stand.

Stands for mobile devices have been designed to allow mobile devices to freely stand on flat surfaces, such as a table, desk, counter, or the like. These stands typically take two forms.

The first form is that of a stand alone device that only engages with or contacts the mobile device when needed—such as an easel, tripod, clip-like stand, or the like. Examples include the Joby® GripTight™ line of stands, the iCarpus® stand, and Anker®'s Multi-Angle Stand. But these designs has the disadvantage of being overly bulky and are not meant to be transported while attached to a mobile device. This requires the stand and the mobile device to be carried separately from one another.

The second form is that of a stand that is integrated into a mobile device case. Such a stand is usually either integrated into the cover of a folio-type case, or is integrated into the outside portion of the back of the case. Examples include those described in U.S. Pat. No. 8,978,883 to Gandhi et al., U.S. Pat. No. 8,985,543 to Chen et al., U.S. Pat. No. 9,717,314 to Idehara et al., U.S. Pat. No. 9,768,822 to Loh et al., and U.S. Pat. No. 9,874,260 Blochlinger et al. These cases enable the stand to be carried while joined to the mobile device, but require a user to purchase and use the associated case in order to use the stand. This greatly limits the flexibility of the stand, as it must be used with the associated case and can only be used with the specific mobile device that the associated case was designed to fit. In addition, the stand portion of these cases is typical made from rigid materials that increase the bulk of the case. The stand portion may also include metal or magnetic materials, such as metal hinges, screws, springs, and the like. These materials can potentially interfere with the mobile devices internal components (e.g., antennae, receivers, transmitters, etc.), can potentially prevent the mobile electronic device from efficiently dissipating heat and cause it to overheat (e.g., while charging, while being used for high-intensity processing, etc.), and may make it impossible for the device to wirelessly charge the battery (e.g., inductive charging, non-radiative charging, radiative electromagnetic resonant charging, etc.)

SUMMARY OF THE INVENTION

As such, it is desirable to provide a new stand for a mobile device which is thin, does not interfere with heat dissipation or wireless transmissions (e.g., wireless charging, wireless data transmission, wireless voice transmission, etc.), and which is easily carried while joined to the mobile device (e.g., in a bag, pocket, etc.).

According to the present invention there is therefore provided a stand for a mobile device as described by way of example below and in the accompanying claims. In one embodiment of the invention there is provided a stand (1) for a mobile device. The stand includes a platform (2) and a flexible stand portion (3). The platform (2) has a front side (12) that faces toward the mobile device when connected to the stand, and a rear side (2a,11) opposite to the front side and facing away from the mobile device when connected to the stand. The flexible stand portion (3) has a sliding end portion (3b) configured to slide back and forth in a sliding direction, and a non-sliding end portion (3c) that rotates around a hinge portion (5). The flexible stand portion (3) is switchable between a flat state where the non-sliding end portion (3c) is arranged against the rear side (2a,11) of the platform (2) and the sliding end portion (3b) is arranged at a first locking position, and a curved state where the non-sliding end portion (3c) is rotated away from the rear side (2a,11) of the platform (2) and the sliding end portion (3b) is arranged at a second locking position different from the first locking position so that the flexible stand portion (3) bows outward to form the shape of a curve or arch (16).

In yet another embodiment, the a flexible stand portion (3) comprises a single piece (33,52) of a material that forms the sliding end portion (3b) and the non-sliding end portion (3c). A location of the hinge portion (5) with respect to the platform (2) does not change when the stand portion (3) switches between the flat state and the curved state.

In a further embodiment, in the curved state, the sliding end portion (3b) is held securely at the second locking position by a curved-state retaining portion (6b) that engages with an engaging portion (13) arranged at the sliding end portion (3b) of the flexible stand portion (3) to maintain the sliding end portion (3b) at the second locking position.

In yet a further embodiment, in the flat state, the flexible stand portion (3) is held securely against the rear side (2a,11) of the platform (2) by a flat-state retaining portion (6a) that engages with an engaging portion (13) arranged at the sliding end portion (3b) of the flexible stand portion (3) to maintain the sliding end portion (3b) at the first locking position.

In another embodiment, the a flexible stand portion (3) comprises a single piece (33,52) of a material that forms the sliding end portion (3b) and the non-sliding end portion (3c). A location of the hinge portion (5) with respect to the platform (2) does not change when the stand portion (3) switches between the closed flat state and the open curved state. The engaging portion (13) is formed by and is part of the single piece (33,52) of the flexible stand portion (3).

In yet another embodiment, the a flexible stand portion (3) comprises a single piece (33,52) of a material that forms the sliding end portion (3b) and the non-sliding end portion (3c). A location of the hinge portion (5) with respect to the platform (2) does not change when the stand portion (3) switches between the closed flat state and the open curved state. The engaging portion (13) is formed from a piece that is different from the single piece (33,52) of the flexible stand portion (3).

In a further embodiment, the flexible stand portion (3) further includes a slider (34) that forms the engaging portion (13), the slider being connected to the sliding end portion (3b) and having a width dimension, in a width direction perpendicular to the sliding direction and to a front-to-back direction of the platform (2), that is larger than a width dimension, in the width direction, of the single piece (33) of the flexible stand portion (3).

In yet a further embodiment, the width dimension of the slider (34) is larger than a maximum width dimension of the single piece (33) of the flexible stand portion (3).

In another embodiment, the entire stand (1) is formed from the single piece (33,50-52) of the material.

In yet another embodiment, the single piece of the material includes a first portion (50), an second portion (51), and a third portion (52). The second portion (51) is integral with and extends from a second side of the first portion (50), and is folded against a first side of the first portion different from the second side. The third portion (52) extends from a third side of the first portion (50) different from the first and second sides, and is folded against the first side of the first portion. The first and second portions (50,51) together form the platform (2), and the third portion (52) forms the flexible stand portion (3).

In a further embodiment, the second portion (51) includes a first arm (55), and a second arm (56) separated from the first arm (55) by a gap (57). A side of the first arm (55) facing toward the second arm (56) and a side of the second arm (56) facing toward the first arm together form at least part of a recess (4) in which the sliding end portion (3b) slides back and forth.

In yet a further embodiment, the platform (2) includes a first piece (31), and a second piece (32) that separate from the first piece (31), second piece (32) being permanently connected to the first piece (31).

In another embodiment, the first piece (31) has a second-piece engaging portion (35), and a second-piece receiving portion (38). The second piece (32) has a first-piece receiving portion (36), in which the second-piece engaging portion (35) of the first piece (31) is received and permanently arranged. The second piece (32) also has a first-piece engaging portion (37) that is received by and permanently arranged in the second-piece receiving portion (38) of the first piece (31).

In yet another embodiment, a curved-state retaining portion (6b) is formed by one of the first and second pieces (31,32), the curved-state retaining portion (6b) engaging with an engaging portion (13) arranged at the sliding end portion (3b) of the flexible stand portion (3) to maintain the sliding end portion (3b) at the second locking position when the flexible stand portion (3) is in the curved state.

In a further embodiment, a flat-state retaining portion (6a) is formed by one of the first and second pieces (31,32), the flat-state retaining portion (6a) engaging with an engaging portion (13) arranged at the sliding end portion (3b) of the flexible stand portion (3) to maintain the sliding end portion (3b) at the first locking position when the flexible stand portion (3) is in the flat state.

In yet a further embodiment, the stand (1) has a front side (12) that faces toward the mobile device when connected to the stand, and a rear side (2a,3a,11) opposite to the front side and facing away from the mobile device when connected to the stand. In the flat state, the stand (1) has a thickness dimension, as measured from the front side (12) to the rear side (2a,3a,11), of 1.5 to 5.5 mm.

In another embodiment, in the flat state, the stand (1) has a maximum thickness dimension, as measured from the front side (12) to the rear side (2a,3a,11), of 1.5 to 5.5 mm.

In yet another embodiment, the material of the flexible stand portion (3), preferably of the single piece (33,52), is an elastomeric material, and the stand (1) does not include any metal or magnetic materials.

In a further embodiment, the material of the flexible stand portion (3), preferably of the single piece (33,52), is selected from the group consisting of rubber, silicone, thermoplastic elastomers ("TPEs"), thermoplastic polyurethane ("TPU"), polyolefins, polypropylene, polycarbonate, polyvinyl chloride acetate ("PVCA"), and any combination thereof.

In yet a further embodiment, an attachment mechanism configured to attach to the mobile device is arranged on the front side (12) of the platform (2).

In another embodiment, the attachment mechanism comprises an adhesive, microsuction cups, microsuction tape, nanosuction cups, nanosuction tape, or a combination thereof.

In yet another embodiment, the platform (2) has a recess (4) located on the rear side (2a,11) of the platform (2). The sliding end portion (3b) is configured to slide back and forth in the recess (4) in a sliding direction.

In another embodiment, the recess has walls (4a,4b) that guide the sliding end portion (3a) of the stand portion as it slides back an forth in the recess (4).

In a further embodiment, a first end portion (3d) of the sliding end portion (3b) is arranged underneath a first rear portion (36,56) of the platform (2) so that the first end portion (3d) is arranged between the first rear portion (36,56) and the mobile device when the mobile device is connected to the stand.

In yet a further embodiment, the first end portion (3d) of the sliding end portion (3b) remains underneath the first rear portion (36,56) of the platform (2) while the sliding end portion (3b) slides back and forth in the recess (4) in the sliding direction to switch the flexible stand portion (3) between the flat state and the curved state.

In another embodiment, a second end portion (3e) of the sliding end portion (3b), which is opposite to the first end portion (3d), is arranged underneath a second rear portion (55) of the platform (2) so that the second end portion (3e) is arranged between the second rear portion (55) and the mobile device when the mobile device is connected to the stand.

In yet another embodiment, the second end portion (3e) of the sliding end portion (3b) remains underneath the second rear portion (55) of the platform (2) while the sliding end portion (3b) slides back and forth in the recess (4) in the sliding direction to switch the flexible stand portion (3) between the flat state and the curved state.

In a further embodiment, a sliding end portion (3b) remains in a flat orientation with respect to the rear side (2a,11) of the platform (2) while the sliding end portion (3b) slides back and forth in the sliding direction to switch the flexible stand portion (3) between the flat state and the curved state.

It is noted that the features of the above-described embodiments are not exclusive to each other, and that any one of the above embodiments/features can be combined with one or more of the other embodiments/features to arrive at further embodiments.

The inventive stand can be designed to fit a variety of mobile devices—such as smartphones and other portable electronic devices—as well as cases therefor.

BRIEF DESCRIPTION OF THE DRAWINGS

FIG. 1 is a rear top-left perspective view of the stand in a closed state in accordance with an embodiment of the invention.

FIG. 2 is a rear top-left perspective view of the stand in an open state in accordance with an embodiment of the invention.

FIG. 3 is a right side crossectional view of the stand in a closed state in accordance with a first embodiment of the invention.

FIG. 4 is a right side crossectional view of the stand in an open state in accordance with the first embodiment of the invention.

FIG. 9 is a right side view of the stand in accordance with the first embodiment of the invention.

FIG. 10 is a left side view of the stand in accordance with the first embodiment of the invention.

DETAILED DESCRIPTION OF EMBODIMENTS

Figure 5:
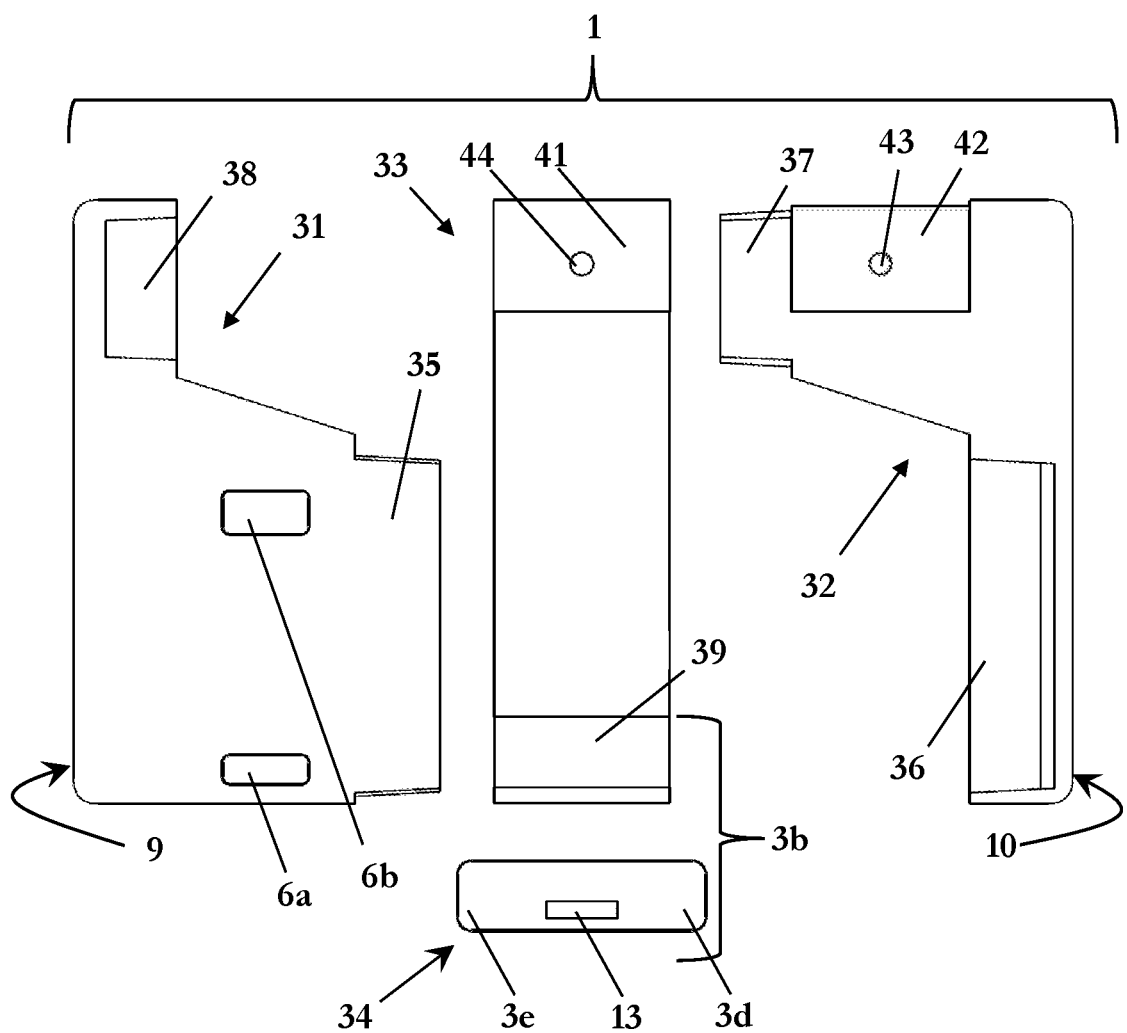
FIG. 5 is an exploded front view of the case in accordance with the first embodiment of the invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

FIGS. 1-4 show rear top-left perspective view of the stand 1 in accordance with an embodiment of the invention. FIGS. 1 and 3 show the stand 1 in a closed state, and FIGS. 2 and 4 show the stand 1 in an open or standing state. The stand 1 has an upper side 7, a lower side 8, a left side 9, and a right side 10. A rear side 11 of the stand 1 faces away from a mobile device when attached to the stand 1, and a front side 12 faces toward a mobile device when attached to the stand 1.

The stand 1 includes a platform 2 and a sliding stand portion 3. The platform 2 has a rear surface 2a and a groove, recess, or track 4. The sliding stand portion 3 has a rear surface 3a, a sliding end portion 3b that slides back and forth in the groove or recess 4, and a non-sliding end portion 3c that rotates around a hinge portion 5. The groove, recess, or track 4 has walls 4a,4b that assist in guiding the end portion 3a as it slides back an forth in the recess 4.

In this way, the sliding stand portion 3 is movable or switchable between the closed/flat position or state (FIGS. 1 and 3) and the open/standing position or state (FIGS. 2 and 4). In the closed state (FIG. 1), the sliding stand portion 3 is in a flat state, and sits or is arranged in the recess 4 and held securely therein by a closed retaining portion 6a. A rear surface 3a of the sliding stand portion 3 is preferably flush, level, or even with the rear surface 2a of the platform 2. This provides the stand 1 with a rear surface that is smooth and flat, making it easy to slide an electronic decide into and out of pockets and the like when attached to the stand 1.

To switch from the closed or flat state (FIG. 1) to the open or standing state (FIG. 2), the non-sliding end portion 3c rotates around the hinge portion 5 away from the rear surface 2a of the platform 2 and the sliding end portion 3b slides along the groove 4 from the lower side 8 toward the upper side 7 upper. The sliding end portion 3b then engages with an open retaining portion 6b of the platform 2.

The sliding end portion 3b includes an engaging portion 13. In the closed state, the engaging portion 13 is held or retained by the closed retaining portion 6a. This maintains the stand 1 in the closed state, ensuring that the stand 1 remains in the closed state during, for example, transportation in a pocket, bag, etc. A user then applies sufficient force to the sliding end portion 3b in a direction toward the upper side 7 to overcome the retaining/engaging force of the closed retaining portion 6a and engaging portion 13 combination, thereby disengaging the engaging portion 13 from the closed retaining portion 6a so that the sliding end portion 3b can be slid in a direction from the lower side 8 toward the upper side 7 of the stand 1 to place the stand 1 in the open or standing state with the sliding stand portion 3 arranged in a curved standing state. In this state, the sliding stand portion 3 is in the shape of a curve or arch 16.

In the standing open state, the engaging portion 13 is held or retained by the open retaining portion 6b. This maintains the stand 1 in the open state, ensuring that the stand 1 remains in the open state even after being placed on a surface such as a table, desk, ledge, rock, etc. A user then applies sufficient force to the sliding end portion 3b in a direction toward the lower side 8 to overcome the retaining/engaging force of the open retaining portion 6b and engaging portion 13 combination, thereby disengaging the engaging portion 13 from the open retaining portion 6b so that the sliding end portion 3b can be slid in a direction from the upper side 7 toward the lower side 8 of the stand 1 to place the stand 1 in the closed or flat state with the sliding stand portion 3 arranged in a straight flat closed state.

In a preferred embodiment, the retaining portions 6a,6b are formed by a groove, channel, recess, indentation, hole, or the like. The engaging portion 13 is then a mechanical feature—such as a protrusion, bulge, lump, nub, or the like—that fits within and engages with the retaining portions 6a,6b. This combination mechanical feature within a recess securely maintains the sliding stand portion 3 in the closed and open states while making it easy and quick for a user to switch the stand 1 between these two states.

In addition, the stand 1 may optionally include an indentation or recess 40, or the like (FIGS. 6, 8, 13, and 14). This indentation or recess 40 is sized or configured so that a user can place a finger into the indentation or recess 40 to provide additional grip/traction/friction for the user's finger—for example, via angled or sloped surfaces 40a—and make it easier to switch/move the sliding stand portion 3 between the closed/flat position or state and the open/standing/curved position or state. Preferably, one, more, or all of the angled or sloped surfaces 40a—which may be convex, concave, or straight—meet the bottom surface 40b of the indentation or recess 40 at an angle of 20° to 90°, preferably at an angle of 30° to 85°, more preferably at an angle of 40° to 80°, and most preferably at an angle of 45° to 65°.

While the figures and embodiments described above show the stand 1 having a single position in the open state as a result of the single open retaining portion 6b, multiple open retaining portion 6b may be formed in the case 1 between the closed retaining portion 6a and the lower side 8 to provide a stand 1 with multiple open-state positions. This provides greater control and selection of the angle formed by the front side 12 and the surface on which the stand is arranged.

The curve or arch 16 serves to hold the stand 1 in a variety of positions. For example, it will hold an attached device in a portrait position with the lower side 8 and at least a portion of the curve or arch 16 arranged on or proximal to the surface on which the stand is arranged and the upper side 7 facing up. This allows the stand to be placed on a surface with the front side 12 at an angle of from 0° to 45°, preferably 5° to 35°, more preferably 10° to 20°, with regard to the surface on which the stand is arranged.

The stand can also be rotated 180° to be in another portrait position, but with the upper side 7 and at least a portion of the curve or arch 16 arranged on or proximal to the surface on which the stand is arranged and the lower side 8 facing up. This allows the stand to be placed on a surface with the front side 12 at an angle of from 0° to 90°, preferably 45° to 85°, more preferably 55° to 80°, with regard to the surface on which the stand is arranged.

And the stand can be arranged in a landscape position with either the left side 9 or the right side 10, along with at least a portion of the curve or arch 16, arranged on or proximal to the surface on which the stand is arranged and the other of the left or right side 10 facing up. This allows the stand to be placed on a surface with the front side 12 at an angle of from 0° to 80°, preferably 30° to 70°, more preferably 40° to 55°, with regard to the surface on which the stand is arranged.

In addition, the curve or arch 16 enables the sliding stand portion 3 to function as a finger loop or grip when the stand 1 is in the open state. This allows a user to slide 1 to 4 fingers into the curve or arch 16 between the sliding stand portion 3 and the platform 2. In this way, as user is able to securely hold an electronic device attached to the stand 1 and prevent the electronic device from being accidentally dropped.

As a result, the stand 1 functions as both a finger loop for securing phone in hand, as well as a stand mechanism to be used hands-free. This provides the benefit of ergonomics and ease of use. Furthermore, the entire stand 1 has a small profile when in the closed state. For example, the stand 1 preferably has a thickness dimension (as measured from the front side 12 surface to the rear side 11 surface) of 1.5 to 5.5 mm. More preferably the thickness is 2.0 to 4.0 mm, and most preferably the thickness is 2.8 mm to 3.2 mm. This small thickness means that the thickness of an electronic device does not change much when connected to the stand 1. Not only does this make it easier for a user to carry an attached device (e.g., in a pocket), but it also allows for closer proximity of the attached electronic device to wireless charging stations—thereby preserving wireless charging functionality of the electronic device (should the device have this feature).

The stand 1 also preferably does not include any metal or magnetic materials. This means that an attached device will have stronger and more reliable wireless signals/connectivity—both wireless data signals (e.g., Bluetooth, WiFi, cellular, 2G, 3G, 4G LTE, etc.) and wireless charging signals (e.g., inductive charging, non-radiative charging, radiative electromagnetic resonant charging, etc.)—than either thicker stands or stands with metal components. The lack of metal also allows an attached mobile device to sufficiently dissipate heat, helping to prevent the device from potentially overheating.

The stand 1 may be injection molded or die-cut, and may be formed from one or more pieces of an elastomeric material, rubber, silicone, thermoplastic elastomers ("TPEs"), thermoplastic polyurethane ("TPU"), polyolefins, polypropylene, polycarbonate, polyvinyl chloride acetate ("PVCA"), a similar plastic, or any combination thereof, which can be folded or stacked into a compact and thin stand 1. The use of polypropylene or a similar soft plastic for at least the sliding stand portion 3 allows for continued use and flexing of the sliding stand portion 3 without compromising its structural integrity.

Figure 6:
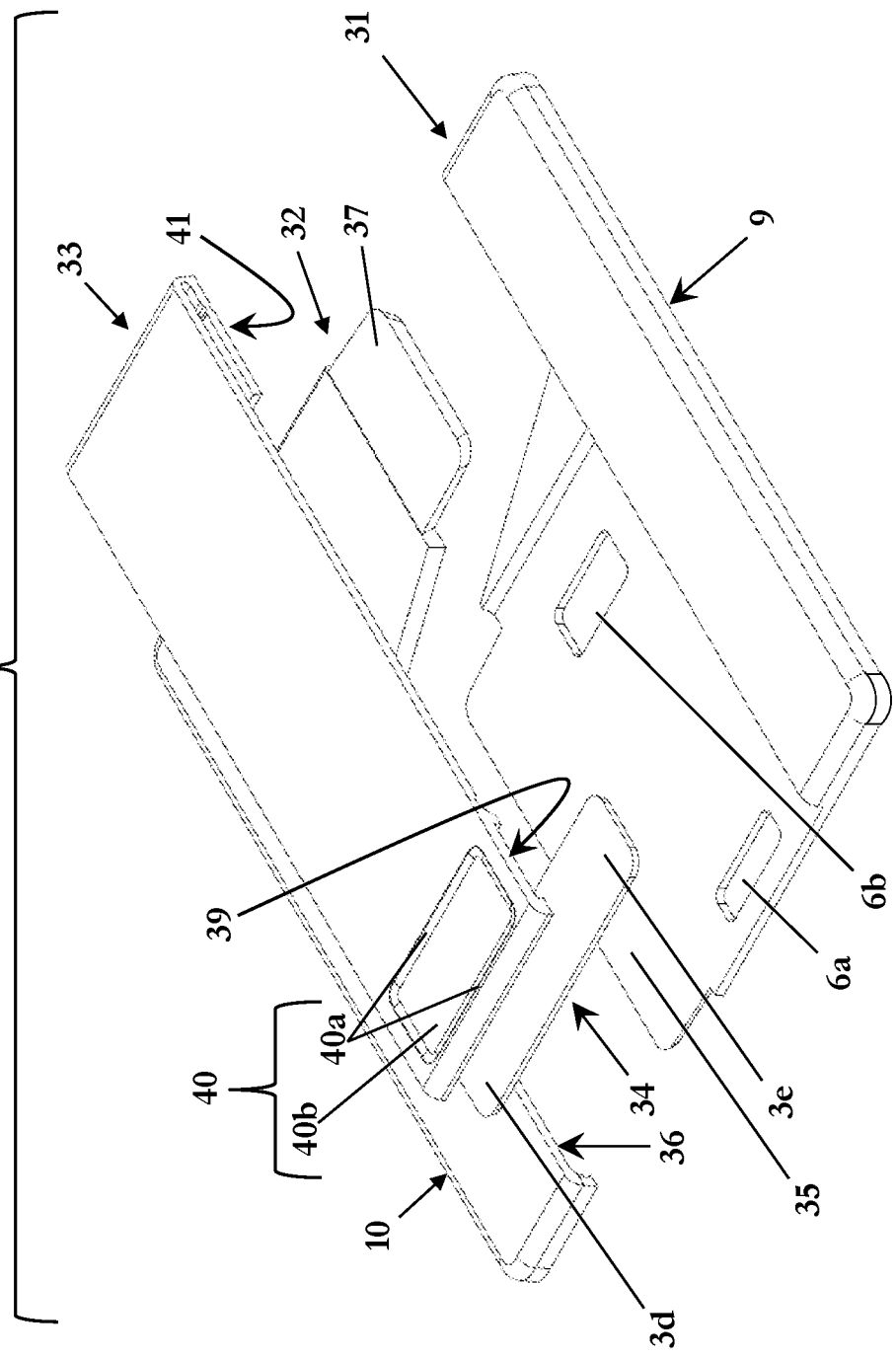
FIG. 6 is an exploded rear-left perspective view of the stand in accordance with the first embodiment of the invention.
Figure 7:
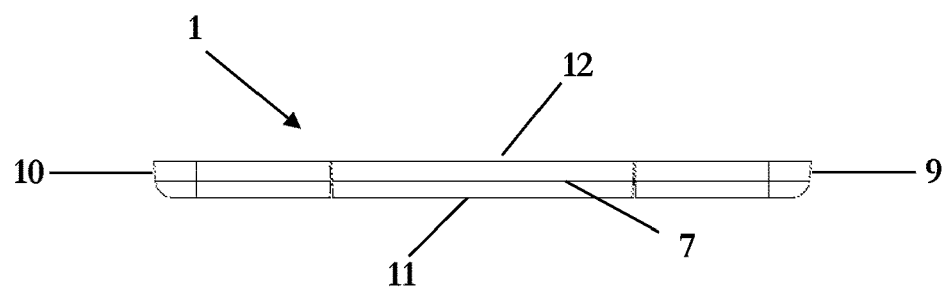
FIG. 7 is a upper side view of the stand in accordance with the first embodiment of the invention.
Figure 8:
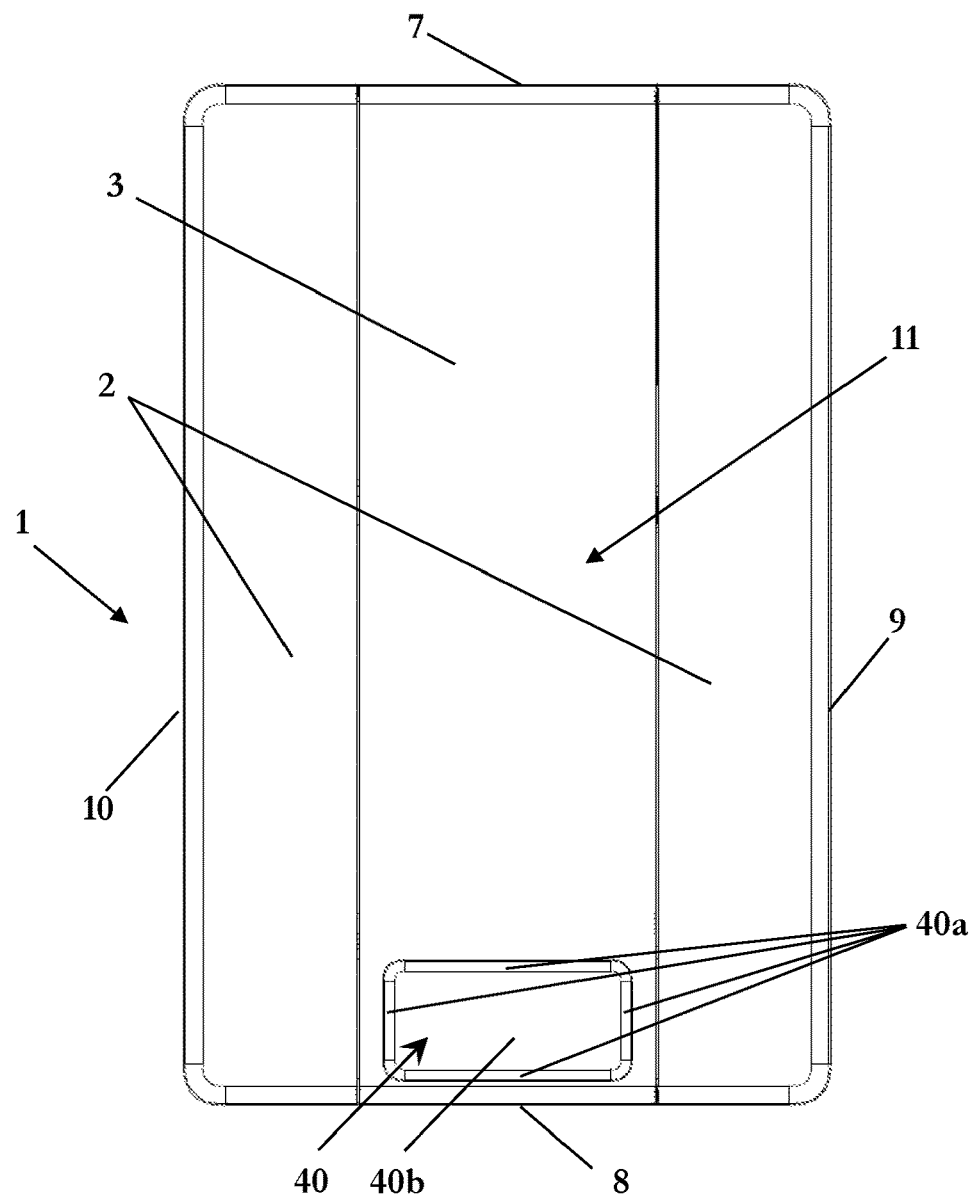
FIG. 8 is a rear view of the stand in accordance with the first embodiment of the invention.
Figure 11:
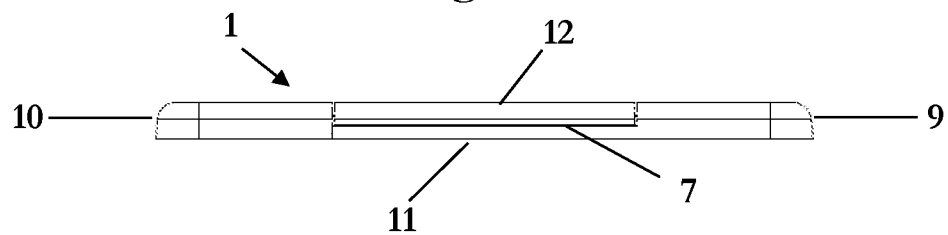
FIG. 11 is a lower side view of the stand in accordance with the first embodiment of the invention.
Figure 12:
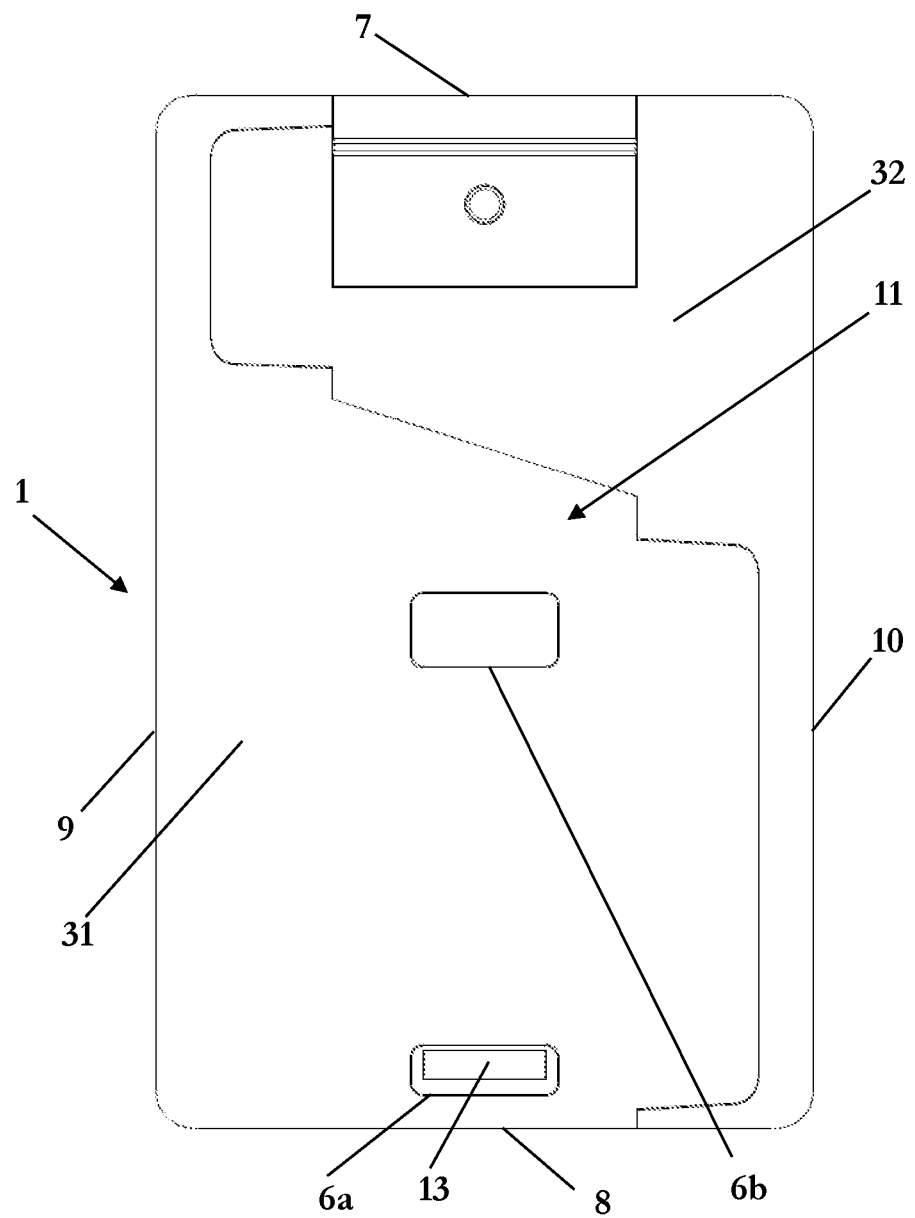
FIG. 12 is a front view of the stand in accordance with the first embodiment of the invention.
Figure 13:
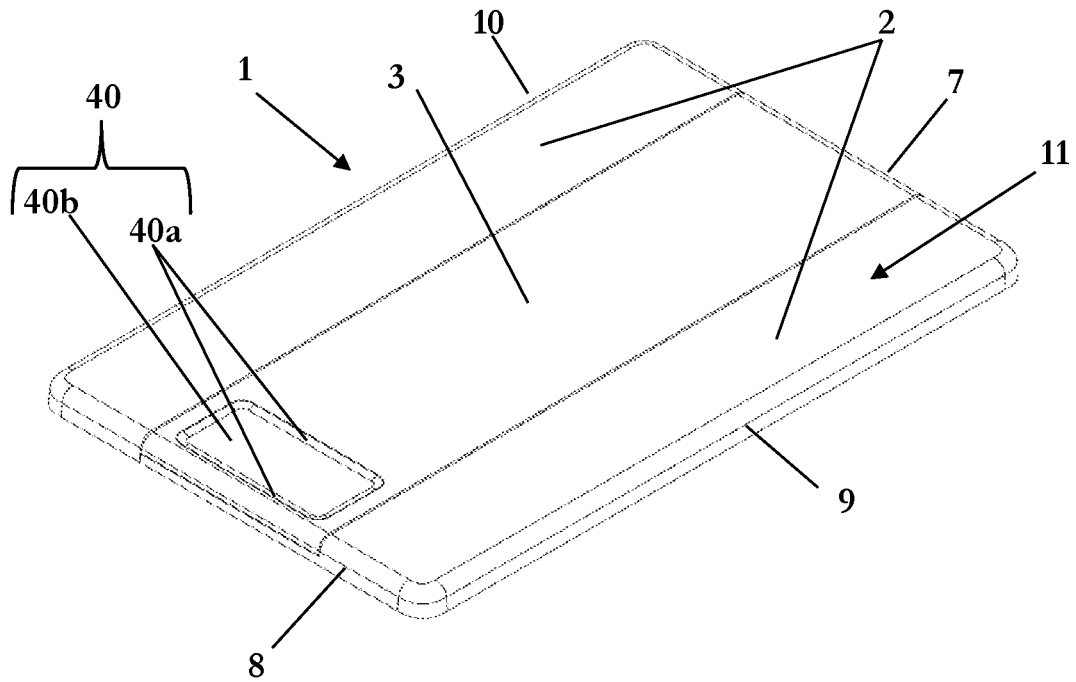
FIG. 13 is a rear lower-left perspective view of the stand in the closed or flat state in accordance with the first embodiment of the invention.
Figure 14:
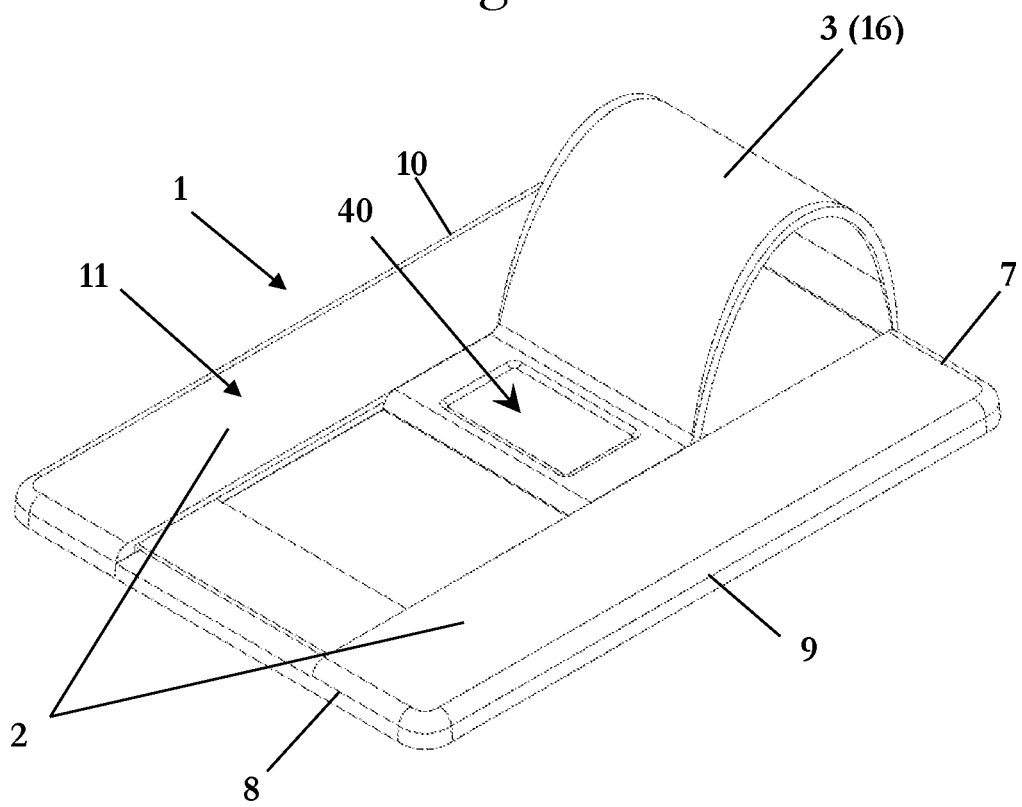
FIG. 14 is a rear lower-left perspective view of the stand in the open or standing state in accordance with the first embodiment of the invention.

As shown in FIGS. 5 and 6, the stand 1 may be formed from multiple pieces made from one or more of the above-listed materials. In the embodiment of FIGS. 5 and 6, the stand 1 includes a left piece 31, a right piece 32, a single center piece 33, and a slider 34. The left piece 31 has a right engaging portion 35 and a right receiving portion 38, and the right piece 32 has a left receiving portion 36 and a left engaging portion 37. The right engaging portion 35 of the left piece 31 engages with and is received by the left receiving portion 36 of the right piece 32 so that the right engaging portion 35 and the left receiving portion 36 are held together. Similarly, the left engaging portion 37 of die right piece 32 engages with and is received by the right receiving portion 38 of the left piece 31 so that the left engaging portion 37 and the right receiving portion 38 are held together. In this way, the left piece 31 and the right piece 32 connect to and are held by each other to form the platform 2.

The slider 34 engages with and is received by a receiving portion 39 of the center piece 33. In this way, the center piece 33 and the slider 34 are held together to form the sliding stand portion 3. The center piece 33 also includes an engaging portion 41 and a receiving portion 44, and the right piece 32 includes a center receiving portion 42 and a center engaging portion 43. The engaging portion 41 of the center piece 33 engages with and is received by the center receiving portion 42 of the right piece 32 so that the engaging portion 41 and the center receiving portion 42 are held together.

Similarly, the center engaging portion 43 of the right piece 32 engages with and is received by the receiving portion 44 of the center piece 33 so that the center engaging portion 43 and the receiving portion 44 are held together. In this way, the left piece 31, right piece 32, center piece 33, and slider 34 are all held together to form the stand 1.

As shown in FIGS. 5 and 6, the receiving portions 36, 38, 42, 44 are formed by grooves, channels, recesses, indentations, holes, or the like, and the engaging portions 35, 37, 41, 43 are formed by mechanical features—such as protrusions, bulges, lumps, nubs, or the like—that fit within and engage with the corresponding receiving portions 36, 38, 42, 44. However, any other suitable receiving and engaging portions intended to mate with each other may be used.

Figure 15:
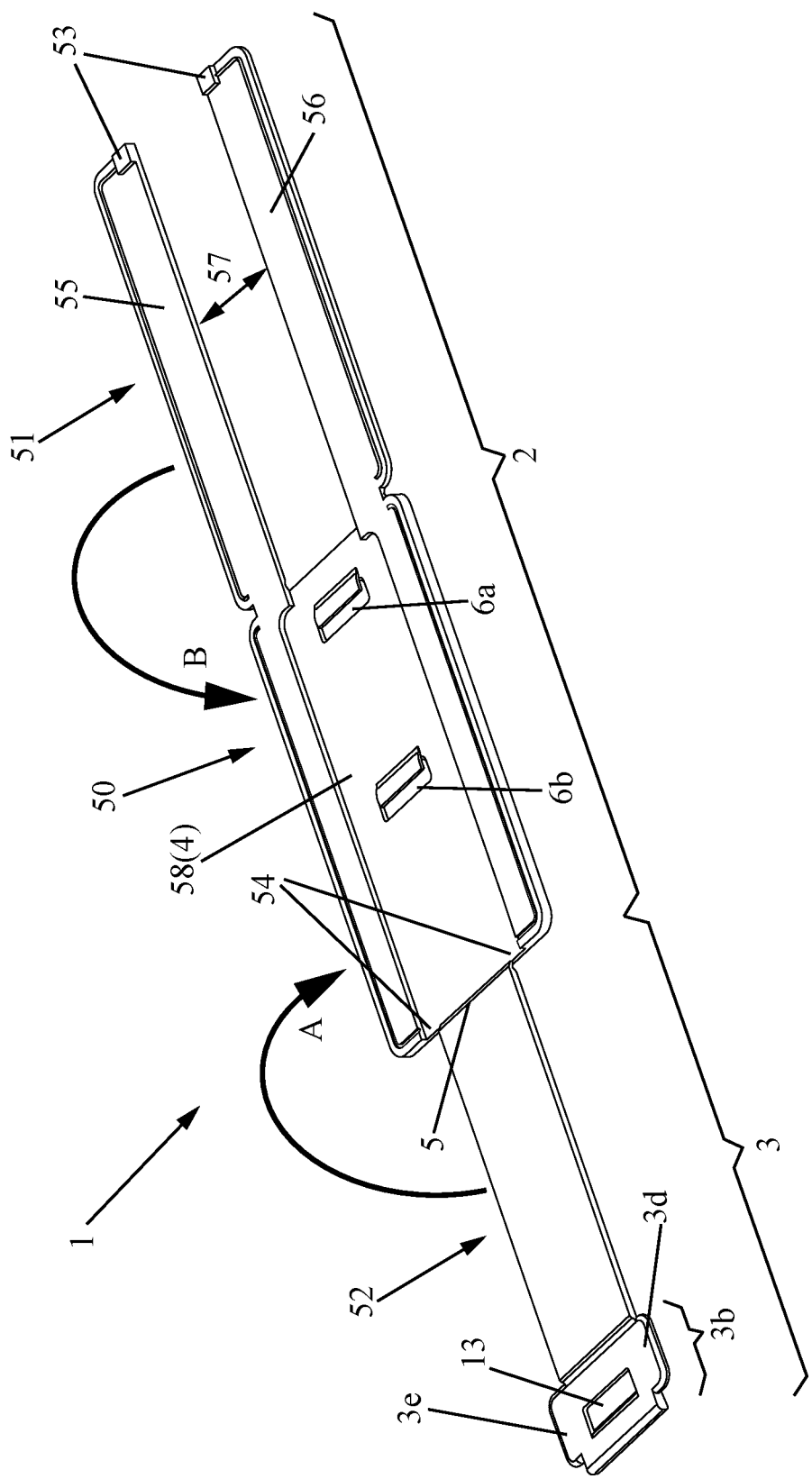
FIG. 15 is an exploded rear upper-right perspective view of the stand in accordance with a second embodiment of the invention.
Figure 16:
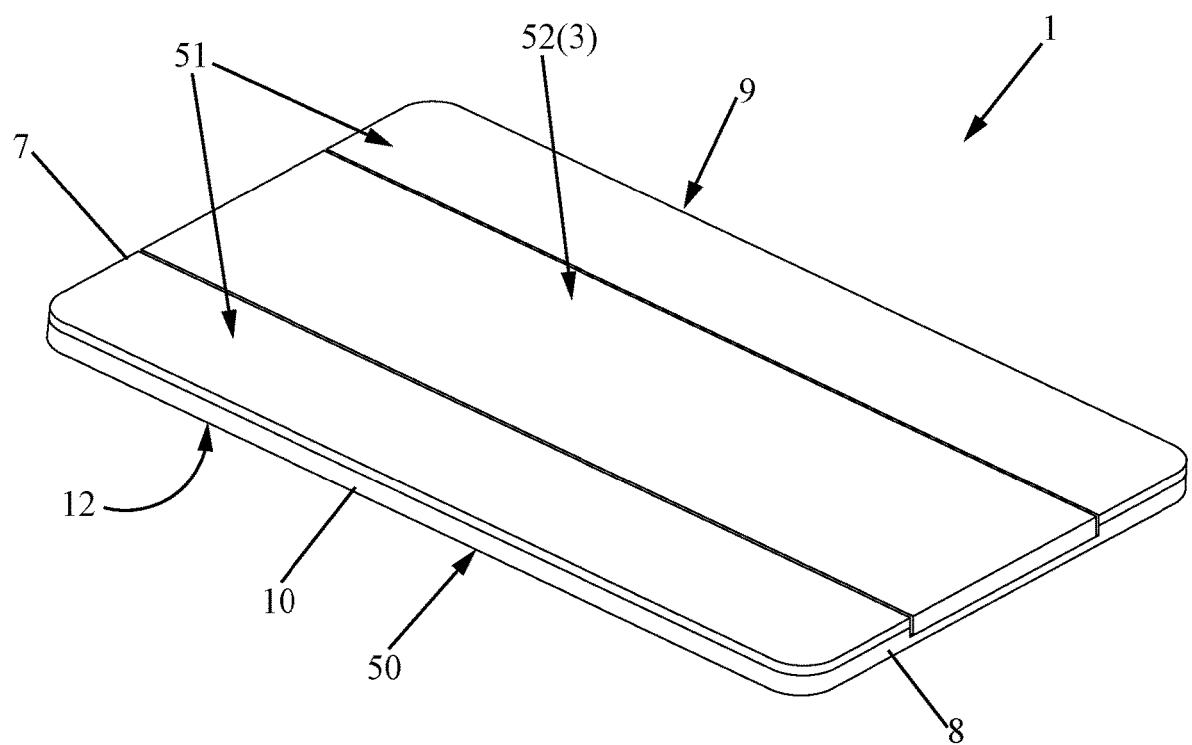
FIG. 16 is a rear lower-right perspective view of the stand in a closed state in accordance with the second embodiment of the invention.
Figure 17:
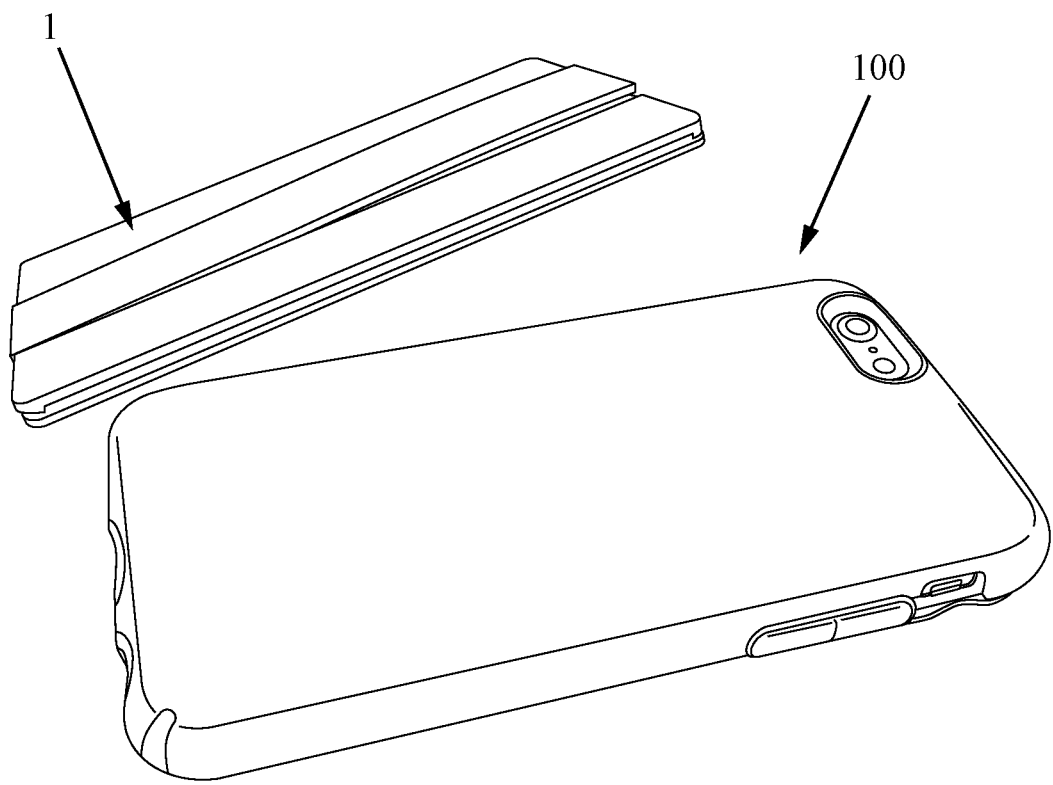
FIG. 17 is a rear lower-left perspective view of the stand 1 in a closed state in accordance with an embodiment of the invention before it is mounted or attached to a mobile device 100.
Figure 18:
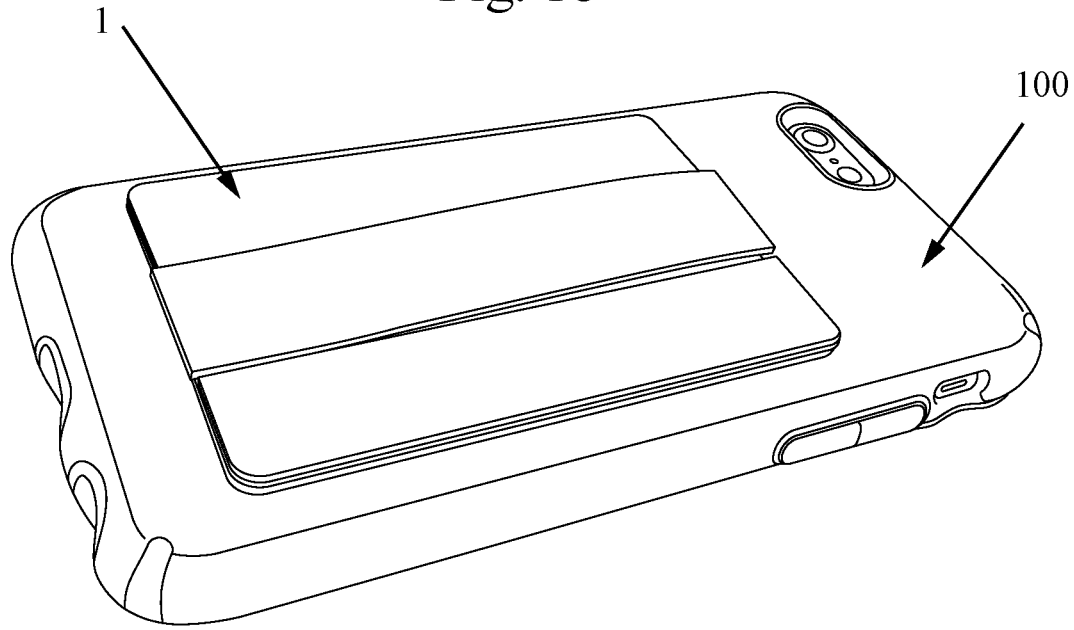
FIG. 18 is a rear lower-left perspective view of the stand 1 in a closed or flat state in accordance with the embodiment of the invention after it is mounted or attached to a mobile device 100.
Figure 19:
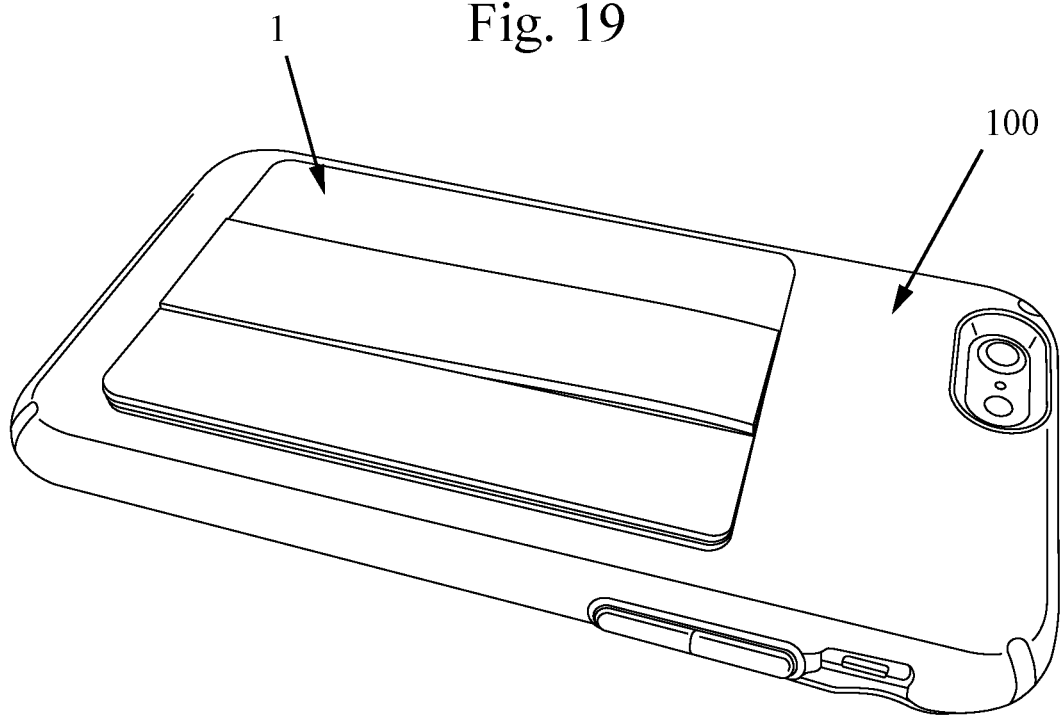
FIG. 19 is a rear upper-left perspective view of the stand 1 in the closed or flat state in accordance with the embodiment of the invention after it is mounted or attached to a mobile device 100.
Figure 20:
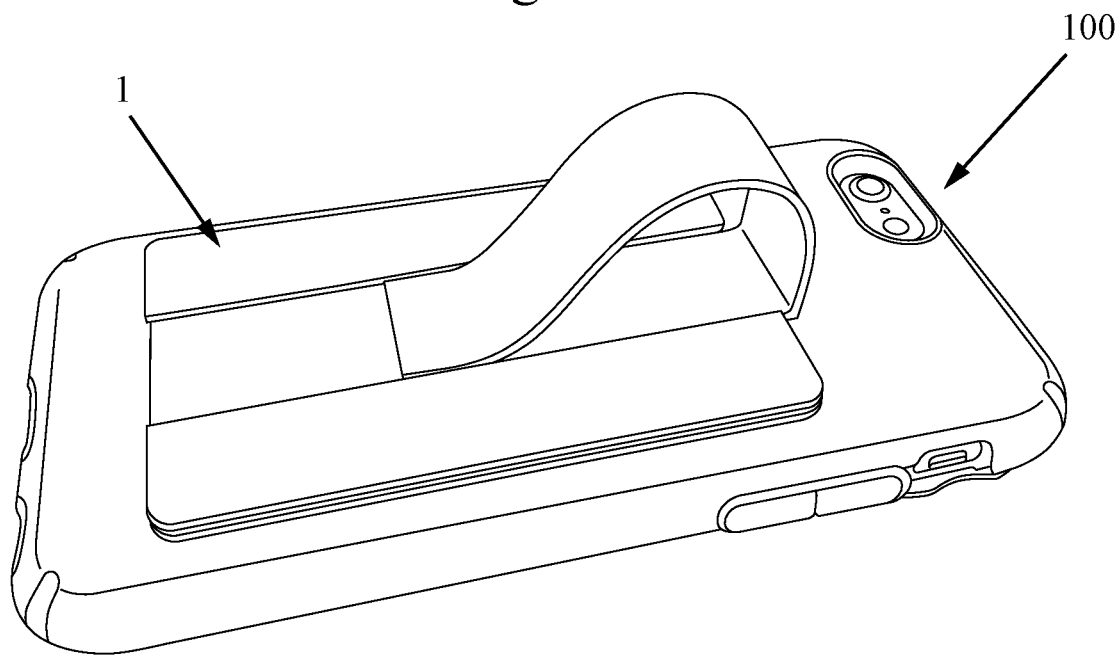
FIG. 20 is a rear lower-left perspective view of the stand 1 in an open, standing, or curved state in accordance with the embodiment of the invention after it is mounted or attached to a mobile device 100.
Figure 21:
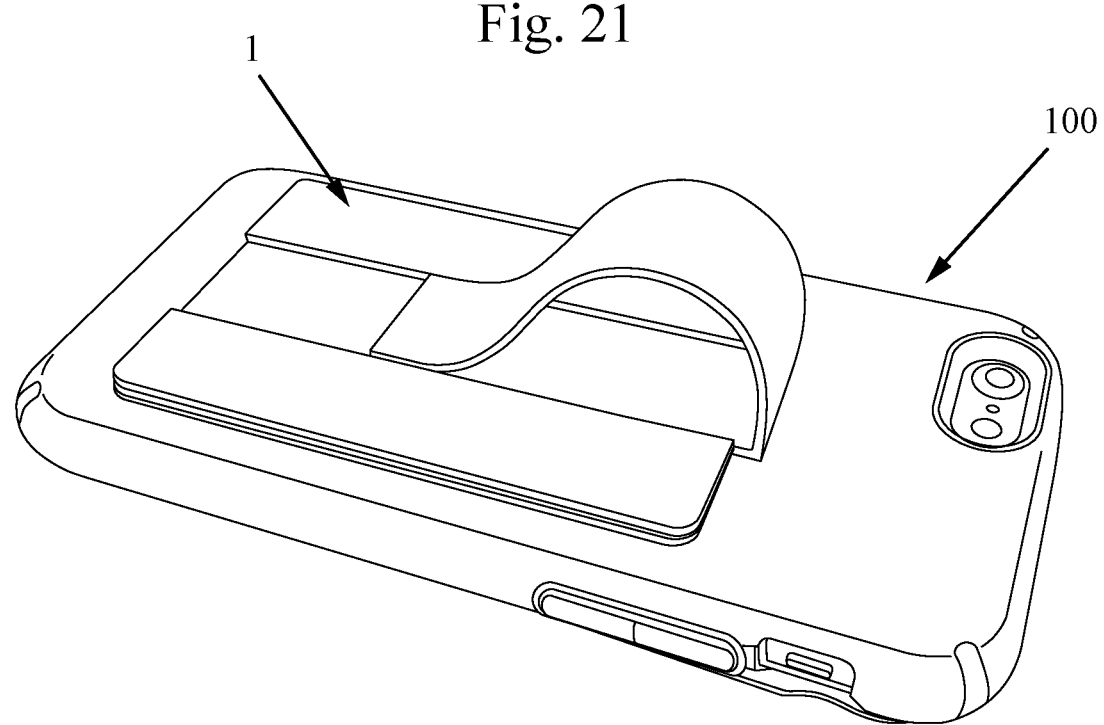
FIG. 21 is a rear upper-left perspective view of the stand 1 in the open, standing, or curved state in accordance with the embodiment of the invention after it is mounted or attached to a mobile device 100.

In another embodiment, as shown in FIGS. 15 and 16, the stand 1 may be injection molded or die-cut, and may be formed from a single-piece formed from one or more of the above-listed materials (e.g., an elastomeric material, rubber, silicone, polypropylene, thermoplastic elastomers ("TPEs"), thermoplastic polyurethane ("TPU"), polyolefins, polypropylene, polycarbonate, polyvinyl chloride acetate ("PVCA"), or a combination thereof), which can then be folded or stacked to form the stand 1. This simplifies the assembly process.

As shown in FIGS. 15 and 16, the stand 1 includes a central portion 50, a lower portion 51 that extends from the lower side of the central portion 50, and an upper portion 52 that extends from the upper side of the central portion 50. The central portion 50 and the lower portion 51 together form the platform 2, and the upper portion 52 forms the sliding stand portion 3. To form the stand 1, the upper portion 52 is rotated toward the central portion 50 in the direction of arrow A so that the upper portion 52 is folded onto the central portion 50 with the engaging portion 13 arranged in the retaining portion 6a. The lower portion 51 is then rotated toward the central portion 50 in the direction of arrow B so that the lower portion 51 is folded onto the central portion 50 and at least part of the sliding end portion 3b. The lower portion 51 is at least partially held to the central portion 50 by engaging portions 53 (e.g., protrusions, bulges, lumps, nubs, or the like) that engage with respective receiving areas or portions 54 (e.g., grooves, channels, recesses, indentations, holes, or the like) of the central portion 50. In this way, the stand 1 is initially formed in the closed state, as shown in FIG. 16.

The lower portion 51 has a left arm 55 and a right arm 56 with a gap 57 formed therebetween. In the embodiment shown in FIG. 15, a right side of the left arm 55 and a left side of the right arm 56 form the track 4 for the sliding end portion 3b together with a recess 58 formed in the central portion 50. However, the central portion 50 could be formed without the recess 58.

In one embodiment, the rear side 11 of the stand 1 forms a wide, flat face or surface in the closed state, thereby allowing for customization in the application of graphics and/or finishes. Preferably, at least 50% of the rear side 11 forms a wide, flat, level face. More preferably, at least 80% of the rear side 11 forms a wide, flat, level face. Most preferably, at least 95% of the rear side 11 forms a wide, flat, level face. And in one embodiment, the entire rear side 11 (i.e., 100%) forms a wide, flat, level face.

The front side 12 of the stand 1 may include an attachment mechanism to attach the stand 1 to a mobile electronic device. For example, a layer of adhesive (e.g., glue, adhesive tape, pressure sensitive adhesive, etc.) may be arranged on the front side 12. As another example, one or more suction cups—such as microsuction cups or nanosuction cups—may be arranged on the front side 12. Microsuction and/or nanosuction cups can be formed on the front side 12 by a layer of microsuction or nanosuction tape, or by forming microsuction and/or nanosuction cups or cavities directly in the material of the stand 1 that forms the front side 12. Using microsuction and/or nanosuction cups allows the stand to be attached to and removed from a mobile electronic device repeatedly without significantly weakening the security of the subsequent attachment or reattachment of the stand 1 to the mobile device. By constructing the case with a generalized device attachment mechanism that is not specific to any particular device of protective case, the stand 1 can be attached to a wide range of mobile electronic devices and protective cases without having to redesign any portion of the stand 1.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A stand for a mobile device, comprising:
    a platform having:
        a front side that faces toward the mobile device when connected to the stand;
        a rear side opposite to the front side and facing away from the mobile device when connected to the stand;
        a first piece; and
        a second piece attachable to and separable from the first piece;
    a flexible stand portion having:
        a sliding end portion configured to slide back and forth in a sliding direction; and
        a non-sliding end portion that rotates around a hinge portion,
    wherein the flexible stand portion is switchable between:
        a flat state, wherein the non-sliding end portion is arranged against the rear side of the platform and the sliding end portion is arranged at a first locking position, and
        a curved state, wherein the non-sliding end portion is rotated away from the rear side of the platform and the sliding end portion is arranged at a second locking position different from the first locking position so that the flexible stand portion bows outward to form the shape of a curve or arch,
wherein the first piece has a second-piece engaging portion and a second-piece receiving portion, and
wherein the second piece has:
a first-piece receiving portion in which the second-piece engaging portion of the first piece is received and permanently arranged; and
a first-piece engaging portion that is received by and permanently arranged in the second-piece receiving portion of the first piece.

2. The stand for a mobile device according to claim 1, wherein the platform has a recess located on the rear side of the platform, and
wherein the sliding end portion is configured to slide back and forth in the recess in the sliding direction.

3. The stand for a mobile device according to claim 1, wherein a flat-state retaining portion is formed by one of the first and second pieces, further comprising: an engaging portion arranged at the sliding end portion of the flexible stand portion, wherein the flat-state retaining portion engages with the engaging portion to maintain the sliding end portion at the first locking position when the flexible stand portion is in the flat state.

4. The stand for a mobile device according to claim 3, further comprising: a curved-state retaining portion configured for engagement with the engaging portion, wherein, in the curved state, the sliding end portion is held securely at the second locking position when the curved-state retaining portion engages with the engaging portion to maintain the sliding end portion at the second locking position.

5. A stand for a mobile device, comprising:
a platform having:
a front side that faces toward the mobile device when connected to the stand;
a rear side opposite to the front side and facing away from the mobile device when connected to the stand; and
a recess located on the rear side of the platform;
a flexible stand portion having:
a sliding end portion configured to slide back and forth in the recess in a sliding direction; and
a non-sliding end portion that rotates around a hinge portion,
wherein the flexible stand portion is switchable between:
a flat state, wherein the non-sliding end portion is arranged against the rear side of the platform and the sliding end portion is arranged at a first locking position; and
a curved state, wherein the non-sliding end portion is rotated away from the rear side of the platform and the sliding end portion is arranged at a second locking position different from the first locking position so that the flexible stand portion bows outward to form the shape of a curve or arch,
wherein a portion of the sliding end portion is arranged underneath a first rear portion of the platform defining a portion of the rear side.

6. The stand for a mobile device according to claim 5, further comprising: an engaging portion arranged at the sliding end portion of the flexible stand portion; and a curved-state retaining portion configured for engagement with the engaging portion, wherein, in the curved state, the sliding end portion is held securely at the second locking position when the curved-state retaining portion engages with the engaging portion to maintain the sliding end portion at the second locking position.

7. The stand for a mobile device according to claim 6, further comprising:
a flat-state retaining portion configured for engagement with the engaging portion,
wherein, in the flat state, the flexible stand portion is held securely against the rear side of the platform when the flat-state retaining portion engages with the engaging portion to maintain the sliding end portion at the first locking position.

8. The stand for a mobile device according to claim 6, wherein the flexible stand portion comprises a single piece of a material that forms the sliding end portion and the non-sliding end portion;
wherein a location of the hinge portion with respect to the platform does not change when the stand portion switches between the flat state and the curved state, and
wherein the engaging portion is formed from a piece that is different from the single piece of the flexible stand portion.

9. The stand for a mobile device according to claim 8, wherein the flexible stand portion further comprises:
a slider that forms the engaging portion, the slider being connected to the sliding end portion and having a width dimension, in a width direction perpendicular to the sliding direction and to a front-to-back direction of the platform, that is larger than a width dimension, in the width direction, of the single piece of the flexible stand portion.

10. The stand for a mobile device according to claim 9, wherein the width dimension of the slider is larger than a maximum width dimension of the single piece of the flexible stand portion.

11. The stand for a mobile device according to claim 8, wherein an entirety of the stand is formed from the single piece of the material.

12. The stand for a mobile device according to claim 1, wherein the platform comprises:
a first piece; and
a second piece attachable to and separable from the first piece.

13. The stand for a mobile device according to claim 12, wherein the first piece has:
a second-piece engaging portion; and
a second-piece receiving portion, and
wherein the second piece has:
a first-piece receiving portion; in which the second-piece engaging portion of the first piece is received and permanently arranged; and
a first-piece engaging portion that is received by and permanently arranged in the second-piece receiving portion of the first piece.

14. The stand for a mobile device according to claim 12, wherein the curved retaining portion is formed by one of the first and second pieces, the curved-state retaining portion engaging with the engaging portion to maintain the sliding end portion at the second locking position when the flexible stand portion is in the curved state.

15. The stand for a mobile device according to claim 12, wherein a flat-state retaining portion is formed by one of the first and second pieces, the flat-state retaining portion engaging with the engaging portion to maintain the sliding end portion at the first locking position when the flexible stand portion is in the flat state.

16. The stand for a mobile device according to claim 5, wherein a flexible stand portion comprises a single piece of a material that forms the sliding end portion and the non-sliding end portion;

wherein a location of the hinge portion with respect to the platform does not change when the stand portion switches between the flat state and the curved state;

wherein the single piece of the material comprises:
 a first portion;
 a second portion that is integral with and extends from a second side of the first portion, and which is folded against a first side of the first portion different from the second side; and
 a third portion that extends from a third side of the first portion different from the first and second sides, and which is folded against the first side of the first portion; and
wherein the first and second portions together form the platform, and the third portion forms the flexible stand portion.

17. The stand for a mobile device according to claim 16, wherein the second portion comprises:
 a first arm; and
 a second arm separated from the first arm by a gap; and
 wherein a side of the first arm facing toward the second arm and a side of the second arm facing toward the first arm together form at least part of the recess.

18. The stand for a mobile device according to claim 5, wherein an attachment mechanism configured to attach to the mobile device is arranged on the front side of the platform; and
 wherein the attachment mechanism comprises an adhesive, microsuction cups, microsuction tape, nanosuction cups, nanosuction tape, or a combination thereof.

19. The stand for a mobile device according to claim 5, wherein the recess has walls that guide the sliding end portion of the stand portion as it slides back and forth in the recess.

20. The stand for a mobile device according to claim 2, wherein a first end portion of the sliding end portion is arranged underneath a first rear portion of the platform so that the first end portion is arranged between the first rear portion and the mobile device when the mobile device is connected to the stand.

21. The stand for a mobile device according to claim 5, wherein the portion of the sliding end portion arranged underneath the first rear portion of the platform is a first end portion of the sliding end portion remains underneath the first rear portion of the platform while the sliding end portion that slides back and forth in the recess in the sliding direction to switch the flexible stand portion between the flat state and the curved state.

22. The stand for a mobile device according to claim 5, wherein the portion of the sliding end portion arranged underneath the first rear portion of the platform is a first end portion of the sliding end portion, and wherein a second end portion of the sliding end portion, which is opposite to the first end portion, is arranged underneath a second rear portion of the platform defining a further portion of the rear side of the platform.

23. The stand for a mobile device according to claim 22, wherein the second end portion of the sliding end portion remains underneath the second rear portion of the platform while the sliding end portion slides back and forth in the recess in the sliding direction to switch the flexible stand portion between the flat state and the curved state.

24. The stand for a mobile device according to claim 5, wherein the sliding end portion remains in a flat orientation with respect to the rear side of the platform while the sliding end portion slides back and forth in the sliding direction to switch the flexible stand portion between the flat state and the curved state.

* * * * *

UNITED STATES PATENT AND TRADEMARK OFFICE
CERTIFICATE OF CORRECTION

PATENT NO. : 10,623,543 B2
APPLICATION NO. : 16/038795
DATED : April 14, 2020
INVENTOR(S) : Mark Gregory Hummel, Bryan Lee Hynecek and Christopher William Ledesma It is certified that error appears in the above-identified patent and that said Letters Patent is hereby corrected as shown below:

In the Claims

Column 12, Line 36, "claim 1" should read --claim 6--.

Signed and Sealed this
Fourth Day of August, 2020

Andrei Iancu
*Director of the United States Patent and Trademark Office*